United States Patent
Hoornaert et al.

(10) Patent No.: US 9,963,390 B2
(45) Date of Patent: May 8, 2018

(54) DRY CEMENT MIXTURE

(71) Applicant: Holcim Technology, LTD, Rapperswil-Jona (CH)

(72) Inventors: Thomas Hoornaert, Paris (FR); Stephane Gonichon, Le Coudray (FR); Delphine Vrau, Crepy en Valois (FR); Hubert Mahouche, Marly (FR); Moussa Baalbaki, Möriken (CH); David Babayan, Aarau Rohr (CH)

(73) Assignee: HOLCIM TECHNOLOGY, LTD., Iona (CH)

( * ) Notice: Subject to any disclaimer, the term of this patent is extended or adjusted under 35 U.S.C. 154(b) by 0 days. days.

(21) Appl. No.: 15/326,879

(22) PCT Filed: Jun. 23, 2015

(86) PCT No.: PCT/IB2015/001017
§ 371 (c)(1),
(2) Date: Jan. 17, 2017

(87) PCT Pub. No.: WO2016/009257
PCT Pub. Date: Jan. 21, 2016

(65) Prior Publication Data
US 2017/0197883 A1  Jul. 13, 2017

(30) Foreign Application Priority Data

Jul. 17, 2014 (AT) .................... A 567/2014
Jan. 8, 2015 (AT) .................... A 10/2015

(51) Int. Cl.
| | |
|---|---|
| *C04B 28/04* | (2006.01) |
| *C04B 7/02* | (2006.01) |
| *C04B 28/08* | (2006.01) |
| *C04B 7/19* | (2006.01) |
| *C04B 40/06* | (2006.01) |
| *C04B 18/02* | (2006.01) |

(52) U.S. Cl.
CPC ............ *C04B 28/08* (2013.01); *C04B 7/19* (2013.01); *C04B 18/02* (2013.01); *C04B 28/04* (2013.01); *C04B 40/0608* (2013.01); *Y02P 40/143* (2015.11); *Y02W 30/94* (2015.05)

(58) Field of Classification Search
CPC .......... C04B 28/04; C04B 28/08; C04B 7/19; C04B 7/02; C04B 40/0608; C04B 20/0076
See application file for complete search history.

(56) References Cited

U.S. PATENT DOCUMENTS

| | | | | |
|---|---|---|---|---|
| 8,323,399 B2* | 12/2012 | Guynn | ............... | C04B 28/02 |
| | | | | 106/705 |
| 8,808,449 B2* | 8/2014 | Jezequel | ............... | C04B 28/04 |
| | | | | 106/713 |
| 2003/0150615 A1* | 8/2003 | Dao | ............... | C04B 7/527 |
| | | | | 166/293 |
| 2012/0037045 A1 | 2/2012 | Fonollosa et al. | | |

FOREIGN PATENT DOCUMENTS

| | | | |
|---|---|---|---|
| DE | 4204727 A | * | 8/1992 |
| DE | 691 17 512 T2 | | 7/1996 |
| JP | 3-170354 A | * | 7/1991 |
| JP | 2003-137618 A | * | 5/2003 |
| WO | 9200251 A1 | | 1/1992 |
| WO | 2010109095 A1 | | 9/2010 |
| WO | 2011/130482 A2 | | 10/2011 |

OTHER PUBLICATIONS

International Search Report issued in International Application No. PCT/IB2015/001017 dated Oct. 10, 2015 (3 pages).
Written Opinion of the International Searching Authority issued in International Application No. PCT/IB2015/001017 dated Oct. 10, 2015 (7 pages).
Long, G., Wang, X., Xie, Y, "Very-high-performance concrete with ultrafine powders," Cement and Concrete Research, vol. 32, 2002, pp. 601-605 (5 pages).
Yunsheng, Z., Wei, S., Sifeng, L., Chujie, J., Jianzhong, L., "Preparation of C200 green reactive powder concrete and its static-dynamic behaviors," Cement and Concrete Composites, vol. 30, 2008, pp. 831-838 (8 pages).

* cited by examiner

*Primary Examiner* — Anthony J Green
(74) *Attorney, Agent, or Firm* — Fitch, Even, Tabin & Flannery, LLP

(57) ABSTRACT

A dry cement mixture comprises Portland cement and an ultra-fine component consisting of at least one ultra-fine additive, said ultra-fine component being a hydraulic binder, wherein Portland cement is present in an amount of at least 70 wt % of the mixture and the ultra-fine component is present in an amount of at least 5 wt % of the mixture, wherein the ultra-fine component has a particle size distribution characterized by a particle diameter $D_{10}$ of between 0.5 μm and 2 μm and a particle diameter $D_{90}$ of between 2 μm and 8 μm.

20 Claims, No Drawings

DRY CEMENT MIXTURE

CROSS-REFERENCE TO RELATED APPLICATIONS

This application is a U.S. national phase application filed under 35 U.S.C. § 371 of International Application No. PCT/IB2015/001017, filed Jun. 23, 2015, designating the United States, and claims priority from Austrian Patent Application Nos. A 567/2014 and A 10/2015, filed Jul. 17, 2014 and Jan. 8, 2015, respectively, the complete disclosures of which applications are hereby incorporated herein by reference in their entirety for all purposes.

FIELD OF THE INVENTION

The invention refers to a dry cement mixture comprising Portland cement and an ultra-fine component consisting of at least one ultra-fine additive, said ultra-fine component being a hydraulic binder, as well as to a concrete composition comprising said cement mixture.

BACKGROUND

Concrete is a very widely used construction material with high strength and good durability. In addition to aggregates and water, it also contains Portland cement as a hydraulic binder, which produces strength-forming phases by solidifying and curing in contact with water. Concrete based on Portland cement clinker is thus one of the most important binders worldwide.

By adding various additives such as, e.g., granulated blast-furnace slag (gbfs), fly ash, natural pozzolans, calcined clays or ground limestone to Portland cement, Portland composite cements having different properties can be produced. At the same time, the specific emission of $CO_2$ will be reduced in the production of cement by substituting the cited additives for Portland cement, because during the production of Portland cement clinker about 0.9 tons of $CO_2$ per ton of Portland cement clinker will be emitted by the calcination of the raw materials and from the oxidation of the fuels in the rotary tubular kiln. The addition of additives to Portland cement has been an established practice for more than 100 years and is regulated in numerous cement and concrete standards.

The addition of ultra-fine additives, such as microcement or microsilica, to Portland cement is used to enhance the durability and the strength of the resulting concrete. The traditional way of formulating high durability and strength and very high durability and strength concrete is based on using ordinary Portland cement with ultra-fine additions as a binder. The ultra-fine additions commonly used are often conditioned in bags and mixed into the Portland cement by hand at the respective concrete plant or at the construction site, which involves safety risks as well as quality uncertainties. The ultra-fine additions can also be stored in a dedicated silo on a concrete plant and introduced automatically, but this involves the need of very specific industrial equipment that represents additional investments.

Another disadvantage of using ultra-fine additives in a cement mixture is the elevated water demand, since the water demand rises with increasing fineness of the ultra-fine additives.

It is commonly assumed that the durability and the strength of the resulting concrete, such as the compressive strength, strongly depends on the proportion of the ultra-fine additions in the cement mixture, namely that the higher the content of ultra-fine additions is, the better the durability and strength of the concrete is. Producing ultra-fine additions is costly due to the elevated grinding effort. Therefore, the cost of the cement mixture rises with an increasing content of ultra-fine additions.

Therefore, it is an object of the present invention to provide a cement mixture that overcomes the above drawbacks. In particular, it is an object of the invention to provide a cement mixture that allows an easy and reliable manufacture of concrete at a stable quality level. It is a further object of the invention to reduce the water demand without impairing the workability of the concrete mass. Further, the resulting concrete shall have excellent durability and strength at a reasonable production cost.

SUMMARY

To solve these and other objects, the invention is characterized in that Portland cement is present in an amount of at least 70 wt %, preferably at least 80 wt % of the mixture and the ultra-fine component is present in an amount of at least 5 wt % of the mixture, wherein the ultra-fine component has a particle size distribution characterized by a particle diameter $D_{10}$ of between 0.5 µm and 2 µm and a particle diameter $D_{90}$ of between 2 µm and 8 µm.

DETAILED DESCRIPTION OF THE INVENTION

Thus, the invention provides a premix binder based on a combination of a Portland cement with at least one ultra-fine additive. The ultra-fine particles added to the mix allow obtaining a binder showing high performances (durability and strength) that is therefore particularly adapted for the formulation of high and very high performance concretes. Mixing is performed on a cement plant with a dedicated device, which introduces the various components with high accuracy, and allows obtaining a very homogeneous mixture. The inventive cement mixture is preferably delivered to customers as a dry premix for concrete production, wherein the dry premix is packed in bags or other suitable containers.

The invention allows concrete manufacturers to produce high strength and high durability concrete using only one binder, instead of mixing ordinary cement with ultra-fine additions (such as silica fume) on site. Customer benefits are regularity of the quality of the concrete produced, ease-of-use (leading to cost savings), high performances of the concrete produced, and aesthetics (the premix binder color is lighter than most of traditional cement and ultra-fine additions used).

It has surprisingly been found that a relatively low content of the ultra-fine component together with a specific particle size distribution results in durability and compressive strength values that usually are only to be achieved with a substantially higher proportion of ultra-fine additives. In particular, the invention provides for an amount of Portland cement of at least 80 wt % of the mixture, which means that the mixture contains a maximum of 20 wt % of the ultra-fine component. According to the invention, the ultra-fine component is a hydraulic binder and has a particle size distribution characterized by a particle diameter $D_{10}$ of between 0.5 µm and 2 µm and a particle diameter $D_{90}$ of between 2 µm and 8 µm.

The ultra-fine component of the cement mixture may consist of one, two or more ultra-fine additives. According to a preferred embodiment of the invention, the at least one ultra-fine additive comprises slag, in particular ground blast furnace slag. More specifically, the at least one ultra-fine additive comprises slag, in particular ground blast furnace slag, preferably in an amount of >70 wt %, in particular >80 wt %.

According to a further preferred embodiment the ultra-fine component (consisting of one or more ultra-fine additives) has a content of slag, in particular ground blast furnace slag, of >70 wt %, in particular >80 wt %. Thus, the ultra-fine component consists mainly of slag particles.

The cement mixture may, in addition to the ultra-fine component, also contain further additives.

According to a preferred design of the cement mixture, Portland cement is present in an amount of at least 85 wt %, preferably at least 90 wt % of the mixture and the ultra-fine component is present in an amount of at least 7 wt %, preferably at least 10 wt % of the mixture. Thus, the maximum content of the ultra-fine component is narrowed down to 15 wt %.

According to a further preferred embodiment, the weight ratio of Portland cement and ultra-fine component is between 85/15 and 95/5, in particular about 90/10.

As mentioned above, the ultra-fine component binder has a particle size distribution characterized by a particle diameter $D_{10}$ of between 0.5 μm and 2 μm, whereas ultra-fine additives usually have a lower $D_{10}$ value in order to achieve the required durability standards. In contrast thereto, it has surprisingly been found that the specific $D_{10}$-range as mentioned above also results in sufficient durability and strength of the concrete, while at the same time reducing water demand and costs.

According to a preferred embodiment, the ultra-fine component has a particle size distribution characterized by a particle diameter $D_{10}$ of between 0.7 μm and 1 μm.

With regard to the $D_{90}$ value, the ultra-fine component preferably has a particle size distribution characterized by a particle diameter $D_{90}$ of between 4 μm and 6 μm. These preferred $D_{90}$ values may be combined with the preferred $D_{10}$ values as mentioned above.

Particularly good results have been achieved by using an ultra-fine component that has a particle size distribution characterized by a particle diameter $D_{100}$ of 10 μm-15 μm, in particular 12 μm.

In the context of the present invention the particle size distribution is defined by indicating specific percentiles of the particle diameter. The $D_{90}$-percentile of the diameter indicates that 90% of the particles have a diameter that is smaller than the given value. For example, a value for $D_{90}$ of 4 μm indicates that 90% of the particles have a diameter that is smaller than 4 μm. Analogously, the $D_{10}$-percentile of the diameter indicates that 10% of the particles have a diameter that is smaller than the given value.

In order to optimize the durability and strength of the resulting concrete, a specific particle size distribution of the Portland cement may also be adjusted. Preferably, the Portland cement has a particle size distribution characterized by a particle diameter $D_{10}$ of between 1 μm and 3 μm, preferably between 1.6 μm and 2 μm, in particular 1.8 μm, and a particle diameter $D_{90}$ of between 30 μm and 60 μm, preferably between 35 and 45 μm, in particular 40 μm.

The Portland cement preferably is a CEM I cement according to EN 197-1.

The invention also refers to a concrete composition comprising a cement mixture according to the invention, aggregates and water. Preferably, the water/cement ratio is chosen between 0.3 and 0.6.

Finally, the invention also refers to a construction element comprising concrete produced using a concrete composition as described above.

In the following, the invention will be explained in more detail by reference to exemplary embodiments.

Example 1

A dry cement mixture with the following components was produced.
90 wt % of Portland cement of the type CEM I 52.5 N
10 wt % of an ultra-fine blast furnace slag binder.
Portland cement having the following particle size distribution was used: $D_{10}$=1.8 μm and $D_{90}$=ca. 40 μm.
Ultra-fine blast furnace slag binder having the following particle size distribution was used: $D_{10}$=ca. 0.8 μm and $D_{90}$=ca. 5.5 μm.
The resulting mixture had the following composition:
Clinker: 86.06 wt %
Blast furnace slag: 7.8 wt %
Gypsum: 5.6 wt %
Anhydrite: 0.3 wt %
Dust: 0.2 wt %
NaCl: 0.04 wt %

Example 2

Concrete was produced from the dry cement mixture as described in example 1. The following components were mixed in a mixer:
410 kg of dry cement mixture as described in example 1
907 kg of aggregates with a nominal maximum coarse diameter of 12.5 mm
797 kg of sand with a nominal maximum coarse diameter of 4 mm
90 kg of limestone filler
Superplasticizer admixture in the amount of 1.2 wt % of the dry cement mixture
160 l of water The wet concrete mass was poured into a form and cured to obtain a concrete block having the following mechanical strength values:
Compressive strength:
1 day: 39 MPa
7 days: 76 MPa
28 days: 89 MPa
Flexural strength:
28 days: 6 MPa
Young modulus:
28 days: 44 GPa Example 3

Concrete was produced form the dry cement mixture as described in example 1. The following components were mixed in a mixer:
450 kg of dry cement mixture as described in example 1
930 kg of aggregates with a nominal maximum coarse diameter of 12.5 mm
790 kg of sand with a nominal maximum coarse diameter of 4 mm
80 kg of limestone filler
Superplasticizer admixture in the amount of 2.0 wt % of the dry cement mixture
148 l of water The wet concrete mass was poured into a form and cured to obtain a concrete block having the following mechanical strength values:
Compressive strength:
1 day: 49 MPa
7 days: 81 MPa
28 days: 94 MPa
Flexural strength:
28 days: 6 MPa
Young modulus:
28 days: 43 GPa Example 4

A comparative study was carried out between concretes composed respectively of:
A/ C50/60 with ordinary Portland cement
B/ C50/60 with dry cement mixture with an optimized dosage
C/ C60/75 with ordinary Portland cement and silica fume addition
D/ C60/75 with dry cement mixture
The denominations "C50/60" and "C65/70" refer to the strength class according to Eurocode 2 (European Standard EN 1992). For example, C50/60 means that the concrete must have a compressive cylinder strength of 50 N/mm$^2$ and a cube compressive strength of 60 N/mm$^2$.
A/ C50/60 with Ordinary Portland Cement:
425 kg of ordinary Portland cement
315 kg of aggregates with a nominal maximum coarse diameter of 12 mm
670 kg of aggregates with a nominal maximum coarse diameter of 20 mm
730 kg of sand with a nominal maximum coarse diameter of 4 mm
Superplasticizer admixture in the amount of 1.3 wt % of the dry cement mixture
175 l of water
The wet concrete mass was poured into a form and cured to obtain a concrete block having the following mechanical strength values:
Compressive strength:
1 day: 12 MPa
7 days: 47 MPa
28 days: 56 MPa
90 days: 57 MPa
Abrasion resistance coefficient (following the Compagnie Nationale du Rhône protocol):
C=0.5
Shock resistance (following the Compagnie Nationale du Rhône protocol):
Volume caused by impacts=108 cm$^3$
The concrete block showed the following characteristics in terms of durability:
Internal porosity: 12.6%
Gas permeability: 119 E−18 m$^2$
Chloride diffusion coefficient (migration test in stationary electric field): 6.8 E−12 m$^2$/s
B/ C50/60 with Dry Cement Mixture with an Optimized Dosage
390 kg of dry cement mixture as described in example 1
315 kg of aggregates with a nominal maximum coarse diameter of 12 mm
670 kg of aggregates with a nominal maximum coarse diameter of 20 mm
765 kg of sand with a nominal maximum coarse diameter of 4 mm
Superplasticizer admixture in the amount of 1.2 wt % of the dry cement mixture
180 l of water
The wet concrete mass was poured into a form and cured to obtain a concrete block having the following mechanical strength values:
Compressive strength:
1 day: 9 MPa
7 days: 44 MPa
28 days: 53 MPa
90 days: 57 MPa
Abrasion resistance coefficient (following the Compagnie Nationale du Rhône protocol):
C=0.5
Shock resistance (following the Compagnie Nationale du Rhône protocol):
Volume caused by impacts=118 cm$^3$
The concrete block showed the following characteristics in terms of durability:
Internal porosity: 13%
Gas permeability: 76 E−18 m$^2$
Chloride diffusion coefficient (migration test in stationary electric field): 8.0 E−12 m$^2$/s
C/ C60/75 with Ordinary Portland Cement+Silica Fume Addition:
415 kg of ordinary Portland cement
270 kg of aggregates with a nominal maximum coarse diameter of 12 mm
700 kg of aggregates with a nominal maximum coarse diameter of 20 mm
800 kg of sand with a nominal maximum coarse diameter of 4 mm
25 kg of silica fume addition
Superplasticizer admixture in the amount of 1.8 wt % of the dry cement mixture
161 l of water
The wet concrete mass was poured into a form and cured to obtain a concrete block having the following mechanical strength values:
Compressive strength:
1 day: 22 MPa
7 days: 56 MPa
28 days: 70 MPa
90 days: 75 MPa
Abrasion resistance coefficient (following the Compagnie Nationale du Rhône protocol):
C=0.3
Shock resistance (following the Compagnie Nationale du Rhône protocol):
Volume caused by impacts=103 cm$^3$
The concrete block showed the following characteristics in terms of durability:
Internal porosity: 11.8%
Gas permeability: 40 E−18 m$^2$
Chloride diffusion coefficient (migration test in stationary electric field): 0.4 E−12 m$^2$/s
D/ C60/75 with Dry Cement Mixture:
440 kg of dry cement mixture as described in example 1
270 kg of aggregates with a nominal maximum coarse diameter of 12 mm
700 kg of aggregates with a nominal maximum coarse diameter of 20 mm
800 kg of sand with a nominal maximum coarse diameter of 4 mm
Superplasticizer admixture in the amount of 1.8 wt % of the dry cement mixture
147 l of water The wet concrete mass was poured into a form and cured to obtain a concrete block having the following mechanical strength values:

Compressive strength:
1 day: 15 MPa
7 days: 63 MPa
28 days: 74 MPa
90 days: 75 MPa Abrasion resistance coefficient (following the Compagnie Nationale du Rhône protocol):
C=0.3

Shock resistance (following the Compagnie Nationale du Rhône protocol):
Volume caused by impacts=91 cm$^3$ The concrete block showed the following characteristics in terms of durability:
Internal porosity: 8.9%
Gas permeability: 72 E–18 m$^2$
Chloride diffusion coefficient (migration test in stationary electric field): 2.2 E–12 m$^2$/s This study shows that the performance of the dry cement mixture of the invention enables to decrease the amount of binder in concrete without affecting its mechanical strength development and its durability. It also performs as well as mixtures composed of ordinary Portland cement and ultra-fine high performance costly additions such as silica fume, from both a mechanical and a durability point of view. The dry cement mixture of the invention allows the production of high performance concrete in an easy way, and at an optimized cost.

The invention claimed is:

1. A dry cement mixture comprising
   (a) at least 70 wt % of Portland cement; and
   (b) at least 5 wt % of an ultra-fine component, which is different than the (a) Portland cement, consisting of at least one ultra-fine additive, said ultra-fine component being a hydraulic binder that contains slag,
   the ultra-fine component having a particle size distribution characterized by a particle diameter $D_{10}$ of between 0.5 µm and 2 µm and a particle diameter $D_{90}$ of between 2 µm and 8 µm, and
   the at least one ultra-fine additive containing slag in an amount of >70 wt. %.

2. The dry cement mixture according to claim 1, wherein the Portland cement is present in an amount of at least 80 wt. % of the dry cement mixture.

3. The dry cement mixture according to claim 1, wherein Portland cement is present in an amount of 70-79 wt. % of the dry cement mixture.

4. The dry cement mixture according to claim 1, wherein
   the Portland cement is present in an amount of at least 85 wt. % of the dry cement mixture; and
   the ultra-fine component is present in an amount of at least 7 wt. % of the dry cement mixture.

5. The dry cement mixture according to claim 1, wherein the weight ratio of Portland cement and the ultra-fine component is between 85/15 and 95/5.

6. The dry cement mixture according to claim 1, wherein the ultra-fine component has a particle size distribution characterized by a particle diameter $D_{10}$ of between 0.7 µm and 1 µm.

7. The dry cement mixture according to claim 1, wherein the ultra-fine component has a particle size distribution characterized by a particle diameter $D_{90}$ of between 4 µm and 6 µm.

8. The dry cement mixture according to claim 1, wherein the ultra-fine component has a particle size distribution characterized by a particle diameter $D_{100}$ of 10 µm-15 µm.

9. The dry cement mixture according to claim 1, wherein the Portland cement has a particle size distribution characterized by
   a particle diameter $D_{10}$ of between 1 µm and 3 µm, and
   a particle diameter $D_{90}$ of between 30 µm and 60 µm.

10. The dry cement mixture according to claim 1, wherein the Portland cement is a CEM I cement according to EN 197-1.

11. The dry cement mixture according to claim 1, wherein the slag comprises ground blast furnace slag.

12. The dry cement according to claim 1, wherein
    the ultra-fine component has a particle size distribution characterized by
       a particle diameter $D_{10}$ of between 0.7 µm and 1 µm,
       a particle diameter $D_{90}$ of between 4 µm and 6 µm, and
       a particle size distribution characterized by a particle diameter $D_{100}$ of (i) 10 µm-15 µm;
    the Portland cement has a particle size distribution characterized by
       a particle diameter $D_{10}$ of between 1 µm and 3 µm, and
       a particle diameter $D_{90}$ of between 30 µm and 60 µm; and
    wherein the weight ratio of Portland cement to the ultra-fine hydraulic component is
    between 85/15 and 95/5.

13. The dry cement according to claim 1, wherein the at least one ultra-fine additive is comprised of slag in an amount of >80 wt. %.

14. The dry cement according to claim 13, wherein the Portland cement is present in an amount of at least 85 wt. % of the dry cement mixture.

15. The dry cement mixture according to claim 1, wherein the Portland cement is present in an amount of at least 90 wt. % of the dry cement mixture.

16. The dry cement mixture according to claim 1, wherein the weight ratio of Portland cement and the ultra-fine component is about 90/10.

17. The dry cement mixture according to claim 1, wherein the Portland cement has a particle size distribution characterized by
    a particle diameter $D_{10}$ of between 1.6 µm and 2 µm, and
    a particle diameter $D_{90}$ of between 35 and 45 µm.

18. The dry cement according to claim 12, wherein the Portland cement has a particle size distribution characterized by
    a particle diameter $D_{10}$ of 1.6 µm and 2 µm,
    a particle diameter $D_{90}$ of between 35 and 45 µm.

19. A concrete composition comprising (a) a cement mixture according to claim 1; (b) aggregates; and (c) water.

20. A construction element comprising concrete produced by curing a concrete composition according to claim 19.

* * * * *